(12) United States Patent
Desurvire et al.

(10) Patent No.: US 6,201,621 B1
(45) Date of Patent: Mar. 13, 2001

(54) OPTICAL REGENERATION FOR OPTICAL-FIBER TRANSMISSION SYSTEMS FOR NON-SOLITON SIGNALS

(75) Inventors: Emmanuel Desurvire, Bruyeres le Chatel; Elisabeth Maunand, Paris, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/024,109

(22) Filed: Feb. 17, 1998

(30) Foreign Application Priority Data

Feb. 18, 1997 (FR) .................................................. 97 01902

(51) Int. Cl.⁷ .......................... H04B 10/00; H04B 10/04
(52) U.S. Cl. .......................... 359/158; 359/176; 359/173
(58) Field of Search ..................... 359/326, 178, 359/158, 181, 188, 156, 333, 334, 335, 336, 337, 338, 339; 385/5

(56) References Cited

U.S. PATENT DOCUMENTS

| | | | |
|---|---|---|---|
| 5,600,479 | * 2/1997 | Evans | 359/237 |
| 5,757,529 | * 5/1998 | Desurvire | 359/179 |
| 5,760,948 | * 6/1998 | Bigo | 359/326 |
| 5,815,307 | * 9/1998 | Arbore et al. | 359/328 |
| 5,903,368 | * 5/1999 | Desurvire | 359/115 |

FOREIGN PATENT DOCUMENTS 0718 992 A1   6/1996   (EP) .

OTHER PUBLICATIONS

S. Bigo et al, "Bit–Rate Enhancement Through Optical NRZ–to–RZ Conversion and Passive Time–Division Multiplexing for Soliton Transmission Systems", Electronics Letters, vol. 30, No. 12, Jun. 9, 1994, pp. 984–985.

M. Nakazawa et al, "40Gbit/s WDM (10Gbit/s×4 Unequally Spaced Channels) Colition Transmission Over 10000KM Using Synchronous Modulation and Narrow Band Optical Filtering", Electronics Letters, vol. 32, No. 9, Apr. 25, 1996, pp. 828–830.

Bigo, S. "Fundamental limits of all–optical NRZ–to–soliton conversion by non–linear optical loop mirrors", Electronics Letters, vol. 31, No. 12, Jun. 8, 1995, pp. 994–995.*

* cited by examiner

Primary Examiner—Jason Chan
Assistant Examiner—Agustin Bello
(74) Attorney, Agent, or Firm—Sughrue, Mion, Zinn, Macpeak & Seas, PLLC

(57) ABSTRACT

A method of regenerating non-soliton RZ optical signals, the method including the steps of: a compression step, whereby the RZ signals are compressed into soliton-type signals; a modulation step whereby synchronous optical modulation is performed on the soliton-type signals, by using a clock; and a decompression step whereby the modulated soliton signals are decompressed into non-soliton RZ signals. The method makes it possible to apply soliton modulation techniques to non-soliton RZ links, so as to increase the data rate or the transmission length of such inks without inducing errors, and without having to modify the transmission medium. The invention also relates to a regenerator operating using the method. It is also possible to apply the method to NRZ signals, by converting them into RZ signals. The invention is also applicable to multiplexed RZ or NRZ signals.

26 Claims, 2 Drawing Sheets

OPTICAL REGENERATION FOR OPTICAL-FIBER TRANSMISSION SYSTEMS FOR NON-SOLITON SIGNALS

The present invention relates to optical regeneration for optical-fiber transmission systems for non-soliton signals. It also relates to a regenerator for such transmission systems.

BACKGROUND OF THE INVENTION

Transmitting Return-to-Zero (RZ) pulses is currently in common use in terrestrial optical-fiber transmission systems. One of the problems encountered, in particular for existing systems, is that of increasing the data rate or the transmission distance without giving rise to error. Various solutions have been proposed. A first approach consists in reducing the duration of the RZ pulses, and in using time-division multiplexing. That approach is limited by the jitter caused by the propagation and by the various optical components of the transmission system. Similar problems are encountered for transmission systems using Non-Return-to-Zero (NRZ) pulses.

In order to mitigate that problem, it is known that the optical signal can be converted into an electronic signal in the regenerators and the electronic signal can then be regenerated. That approach is intrinsically limited by the pass-band of the semiconductor components used. It is also limited in terms of the maximum length of the transmission system. In addition, it is costly when the data rate is increased.

It has also been proposed to perform wavelength conversion, relative to a local clock of different wavelength and without jitter, by applying the RZ signal with jitter as a control signal to the clock. In addition to requiring a local clock, that technique also suffers from the drawback of being difficult to apply when wavelength-division multiplexing is used, or, more generally, when it is awkward to change wavelength.

Transmitting soliton pulses or solitons is known. Such pulses are RZ pulses of time width (Full Width at Half Maximum (FWHM)) that is narrow relative to bit time, they have a determined relationship between power, spectrum width, and time width, and they propagate generally in the "abnormal" dispersion portion of an optical fiber. The variation in the envelope of such a soliton pulse in a monomode fiber can be modelled by the non-linear Schrödinger equation: propagation relies on a balance between the abnormal dispersion of the fiber and its non-linearity. In order to control the jitter of such soliton signals, various solutions have been proposed. It is known that sliding guiding filter systems can be used (see, for example, EP-A-0 576 208). It has also been proposed to perform synchronous modulation on the soliton signals. For that purpose, it is possible to use modulators of various types, and in particular synchronous amplitude or phase modulators using the Kerr effect. Descriptions of the various techniques for controlling or regenerating soliton signals can be found in the article entitled "Soliton Transmission Control in Time and Frequency Domains" by H. Kubota and M. Nakazawa, IEEE Journal of Quantum Electronics, vol. 29, No. 3, 2189, or in the article entitled "Evaluating the Capacity of Phase Modulator-Controlled Long-Haul Soliton Transmission" by N. J. Smith and N. J. Doran, Optical Fibers Technology I, 218–235 (1995).

Those techniques are not limited by the pass-band of electronic components. Unfortunately, they cannot be applied directly to non-soliton RZ pulses because the pulses or their spectrums are different from soliton signals.

OBJECTS AND SUMMARY OF THE INVENTION

The present invention provides an original and simple solution to the problem of controlling jitter in non-soliton RZ optical signals. The term "non-soliton optical signals" is used to mean signals having one or more of the following characteristics: wide time width (FWHM) relative to bit time, i.e. greater than approximately in the range 30% thereof to 40% thereof; no determined relationship between power, spectrum width, and time width; propagation generally or on average in the normal dispersion or zero dispersion portion of an optical fiber; and no balance between the dispersion and the non-linearity during propagation.

In certain embodiments, the invention also makes it possible to correct not only the jitter or the phase noise, but also the amplitude noise of the non-soliton RZ signals. The invention is advantageously applicable to existing terrestrial transmission systems, for which it makes it possible to increase the data rate or the maximum transmission distance without requiring any action to be taken on the transmission medium. The invention thus makes it possible, merely by adding or modifying control systems, to increase the capacity of existing links.

More precisely, the invention provides a method of regenerating non-soliton RZ optical signals, the method comprising the following steps:

a compression step whereby the RZ signals are compressed into soliton-type signals;

a modulation step whereby synchronous optical modulation is performed on the soliton-type signals, by using a clock; and a decompression step whereby the modulated soliton signals are decompressed into non-soliton RZ signals.

It is possible to provide a clock recovery step whereby the clock is recovered from the non-soliton RZ signals, from the soliton-type signals, or from the regenerated non-soliton RZ signals.

The compression step advantageously comprises at least one of the following steps:

performing spectrum or time processing on encoded optical signals, in particular by spectrum filtering;

amplification; and causing the signals to propagate along a highly dispersive non-linear optical medium.

The decompression step preferably comprises at least one of the following steps:

time spreading; and post-amplification.

In one implementation, the modulation step whereby synchronous optical modulation is performed on the soliton-type signals is repeated so that it is performed at least twice.

It is also possible to provide at least one filtering step whereby the soliton-type signals are filtered by a filter chosen from the group formed of guiding filters and sliding guiding filters.

The invention also provides a method of regenerating NRZ optical signals, the method comprising:

an NRZ-to-RZ conversion step whereby the NRZ optical signals are converted into non-soliton RZ signals;

a regeneration step whereby the non-soliton RZ signals are regenerated using the method of the invention; and an RZ-to-NRZ conversion step whereby the regenerated RZ optical signals are converted into NRZ signals.

The invention also provides a method of regenerating multiplexed non-soliton RZ optical signals, the method comprising:

a demultiplexing step whereby the signals are demultiplexed;

a regeneration step whereby the demultiplexed signals are regenerated using the method of the invention; and a multiplexing step whereby the regenerated signals are multiplexed.

The invention also provides a method of regenerating multiplexed non-soliton RZ optical signals, the method comprising:

a synchronization step whereby the channels of the multiplex are synchronized; and a regeneration step whereby the signals of the synchronized channels are regenerated using the method of the invention.

In one implementation, the invention provides a method of regenerating NRZ optical signals, the method comprising:

an NRZ-to-RZ conversion step whereby the NRZ optical signals are converted into non-soliton RZ optical signals;

a regeneration step whereby the non-soliton RZ optical signals are regenerated using the method of the invention; and an RZ-to-NRZ conversion step whereby the regenerated RZ optical signals are converted into NRZ optical signals.

In another implementation, the invention provides a method of regenerating multiplexed NRZ optical signals, the method comprising:

a demultiplexing and NRZ-to-RZ conversion step whereby the NRZ optical signals are demultiplexed and converted into non-soliton RZ optical signals;

a regeneration step whereby the RZ optical signals are regenerated using the method of the invention; and a multiplexing and RZ-to-NRZ conversion step whereby the regenerated RZ optical signals are multiplexed and converted into multiplexed NRZ optical signals.

In addition, the invention provides a method of regenerating multiplexed NRZ optical signals, the method comprising:

an NRZ-to-RZ conversion step whereby the NRZ optical signals are converted into non-soliton RZ optical signals;

a synchronization step, whereby the channels of the multiplex are synchronized;

a regeneration step whereby the non-soliton RZ optical signals of the synchronized channels are regenerated using the method of the invention; and an RZ-to-NRZ conversion step whereby the regenerated RZ optical signals are converted into NRZ optical signals.

The invention also provides a regenerator for regenerating non-soliton RZ optical signals, the regenerator comprising compression means for compressing the RZ signals into soliton-type signals;

modulation means for performing synchronous optical modulation on the soliton-type signals, by using a clock; and decompression means for decompressing the modulated soliton signals into non-soliton RZ signals.

The modulation means may include clock recovery means for recovering the clock from the non-soliton RZ signals, from the soliton-type signals, or from the regenerated non-soliton RZ signals.

The compression means advantageously comprise at least one of the following means:

means for performing spectrum or time processing on encoded optical signals, in particular spectrum filtering means;

amplification means; and a highly dispersive non-linear optical medium, in particular of variable dispersion.

The decompression means preferably comprise at least one of the following means:

time spreading means; and post-amplification means.

In one implementation, at least one of the compression means and of the decompression means comprises a length of optical fiber.

It is also possible to provide cascading means for cascading the modulation means, for at least a portion of the soliton-type signals. For example, the cascading means may comprise a first circulator upstream from the modulation means, a second circulator downstream therefrom, and a non-linear propagation medium; in which case, the first circulator receives the signals to be modulated and delivers them to the modulation means, and it receives signals that have been modulated twice from the modulation means and delivers them to the decompression means; and the second circulator receives signals that have been modulated once from the modulation means and delivers them to the propagation means, and it receives the signals that have propagated along the propagation medium and delivers them to the modulation means.

It is also possible to provide filtering means for filtering the soliton-type signals, which means are chosen from the group formed of guiding filters and of sliding guiding filters.

The invention also provides a regenerator for regenerating multiplexed non-soliton RZ optical signals, the regenerator comprising:

demultiplexing means for demultiplexing the signals;

a plurality of regenerators of the invention, as described above; and multiplexing means for multiplexing the regenerated signals.

It also provides a regenerator for regenerating multiplexed non-soliton RZ optical signals, the regenerator comprising:

synchronization means for synchronizing the channels of the multiplex; and a regenerator of the invention, as described above.

The invention also provides a regenerator for regenerating NRZ optical signals, the regenerator comprising:

NRZ-to-RZ conversion means for converting the NRZ optical signals into non-soliton RZ optical signals, upstream from said compression means;

a regenerator of the invention, as described above; and

RZ-to-NRZ conversion means for converting the regenerated RZ optical signals into NRZ optical signals, downstream from said decompression means.

The invention also provides a regenerator for regenerating multiplexed NRZ optical signals, the regenerator comprising:

demultiplexing and NRZ-to-RZ conversion means for demultiplexing the NRZ optical signals and converting them into non-soliton RZ optical signals;

a plurality of regenerators of the invention, as described above; and multiplexing and RZ-to-NRZ conversion means for multiplexing the regenerated RZ optical signals and converting them into multiplexed NRZ optical signals.

The invention also provides a regenerator for regenerating multiplexed NRZ optical signals, the regenerator including:

NRZ-to-RZ conversion means for converting the NRZ optical signals into non-soliton RZ optical signals;

synchronization means for synchronizing the channels of the multiplex; and a regenerator of the invention, as described above.

Finally, the invention covers an optical-fiber optical transmission system including at least one such regenerator.

BRIEF DESCRIPTION OF THE DRAWINGS

Other characteristics and advantages of the invention appear on reading the following description of embodiments of the invention, given by way of example and with reference to the accompanying drawings, in which.

MORE DETAILED DESCRIPTION

Figure 1:
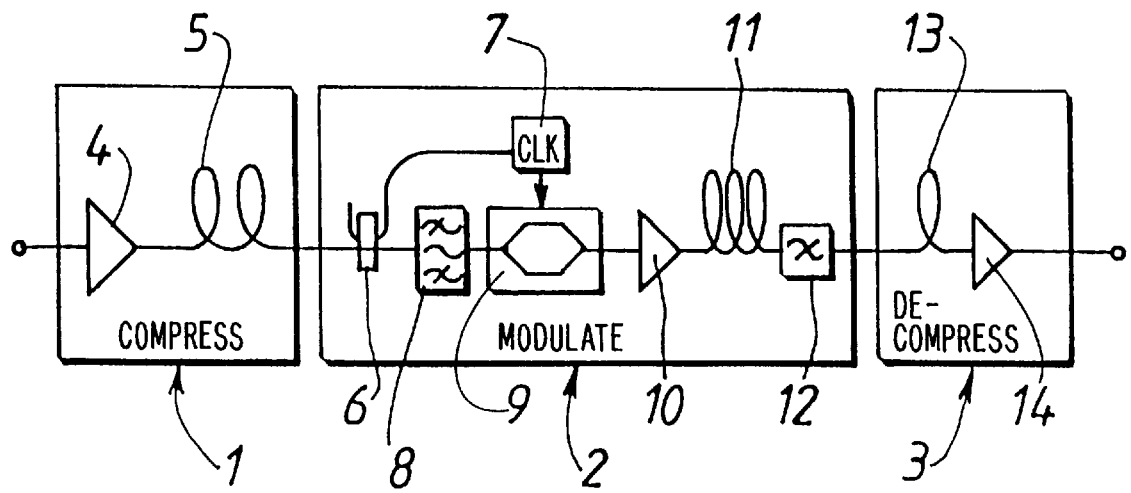
FIG. 1 is a diagram showing a first embodiment of a regenerator of the invention.

FIG. 1 is a diagram showing a first embodiment of a regenerator of the invention. The FIG. 1 regenerator is designed to be used in an optical fiber transmission system for RZ signals, as in a commonly installed terrestrial system. The FIG. 1 regenerator comprises compression means 1 for compressing the RZ signals into soliton-type signals, modulation means 2 for performing synchronous optical modulation on the soliton-type signals, and decompression means 3 for decompressing the modulated soliton signals into non-soliton RZ signals.

The compression means 1 in the embodiment shown in FIG. 1 include a preamplifier 4 which receives the RZ optical signals to be regenerated. The outlet of the preamplifier 4 is connected to a compression fiber 5, e.g. a Kerr fiber having high dispersion. It is possible to vary the dispersion of the fiber as a function of distance so as to optimize the compression factor. The fiber delivers compressed signals which behave like soliton signals. It is possible to use some other compression means for converting the non-soliton RZ optical signals into soliton-type signals, e.g. to use spectrum filtering or some other type of spectrum or time processing on the signals, with or without amplification, or a combination of various compression means.

The compression means thus deliver soliton-type optical signals, i.e. optical signals that behave like solitons, to the modulation means 2. The modulation means apply soliton synchronous modulation to the signals, which modulation may be phase and/or amplitude modulation. The modulation means include a coupler 6 which receives the signals from the Kerr fiber 5, and which divert a portion of said signals towards a clock recovery circuit 7. The remaining portion of the soliton-type signals is delivered to the inlet of a filter 8. For example, the filter 8 may be of the guiding type, i.e. a filter that produces a centering effect that centers the soliton on its nominal frequency. The signals filtered by the filter 8 are delivered to a synchronous modulator 9 which is controlled by a the clock delivered by the circuit 7. The modulator 9 performs phase and/or intensity modulation on the soliton-type signals. The outlet of the modulator 9 is connected to an amplifier 10 followed by a fiber 11 which re-shapes the soliton signals. The fiber 11 is a fiber having high dispersion and its dispersion profile may vary. The fiber has a length not less than the period of the soliton signals, so that a modulated soliton signal is obtained that is of good quality. The outlet of the fiber 11 is connected to a filter 12 which removes the clock. The outlet of the filter 12 constitutes the outlet of the modulation means 2.

It is possible to use any known modulation circuit that is suitable for soliton signals, e.g. a Non-linear Optical Loop Mirror (NOLM), a Kerr fiber, an electro-optical modulator or an opto-electronic modulator, or some other circuit. The modulation means are adapted accordingly by adding or removing filters 8 or 12, amplifiers 10, or fiber 11.

The decompression means 3 receive the regenerated soliton-type signal output by the filter 12. They comprise an expansion fiber 13 connected to a post-amplifier 14. Non-soliton RZ signals are obtained at the outlet of the post-amplifier 14. It is also possible to use other decompression means to convert the soliton-type signals into non-soliton RZ optical signals.

In the embodiment shown in FIG. 1, a clock is used that is recovered from the soliton-type signal prior to modulation. Clearly, it is equally possible to recover the clock from the soliton-type signals after they have been modulated, from the non-soliton RZ optical signals received at the inlet of the compression means, or else from the regenerated RZ signals; to generate the modulation clock, it is equally possible to use a local oscillator at the bit frequency of the signal to be regenerated, and to control the phase of the oscillator, e.g. by means of a phase-locked loop or of negative feedback of some other type.

Figure 2:
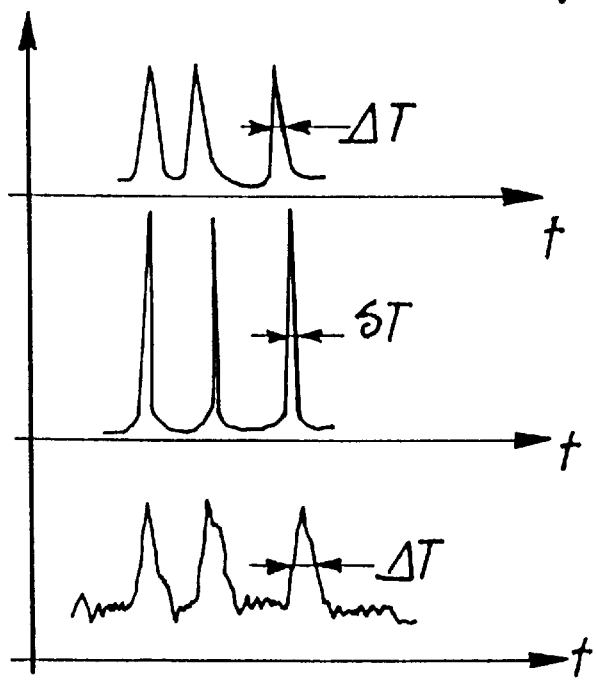
FIG. 2 shows the waveforms of the input signals (bottom) and of the output signals (top) of the FIG. 1 regenerator, and the waveform of the output signals of the compression means of the regenerator.

It is clear how the regenerator in FIG. 1 operates. FIG. 2 shows, going upwards from the bottom, the waveforms of the input signals of the regenerator, of the output signals of the compression means 1, and of the output signals of the regenerator. At its inlet, the regenerator receives non-soliton RZ signals that are of width ΔT substantially equal to one half of the bit time, and that are affected by jitter and by amplitude noise. At the outlet of the compression means, the signals are of the soliton-type, i.e. they are of narrower width ST relative to the bit time, typically about 20% of the bit time, with, in addition, the peak power and the spectrum width that are required for soliton propagation. Like the RZ signals, these signals are affected by time jitter and by amplitude noise. At the outlet of the regenerator, signals are obtained that are non-soliton RZ signals of waveform similar to that of the input signals, and in which the time jitter has been considerably reduced by the modulation. The amplitude noise is also reduced due to the synchronous modulation, as explained, for example, in the article by H. Kubota (see FIG. 6).

The regenerator shown in FIG. 1 can be made with comparatively short lengths of fiber, i.e. shorter than about ten or a few tens of kilometers, by choosing appropriate dispersions. A compact regenerator is thus obtained that can be contained in a standard electronic rack or frame. This regenerator may advantageously be used for upgrading existing transmission systems: it makes it possible to increase data rate without having to act on the propagation medium itself, and thus at low cost. It is also possible to use this regenerator for extending existing transmission systems.

Figure 3:
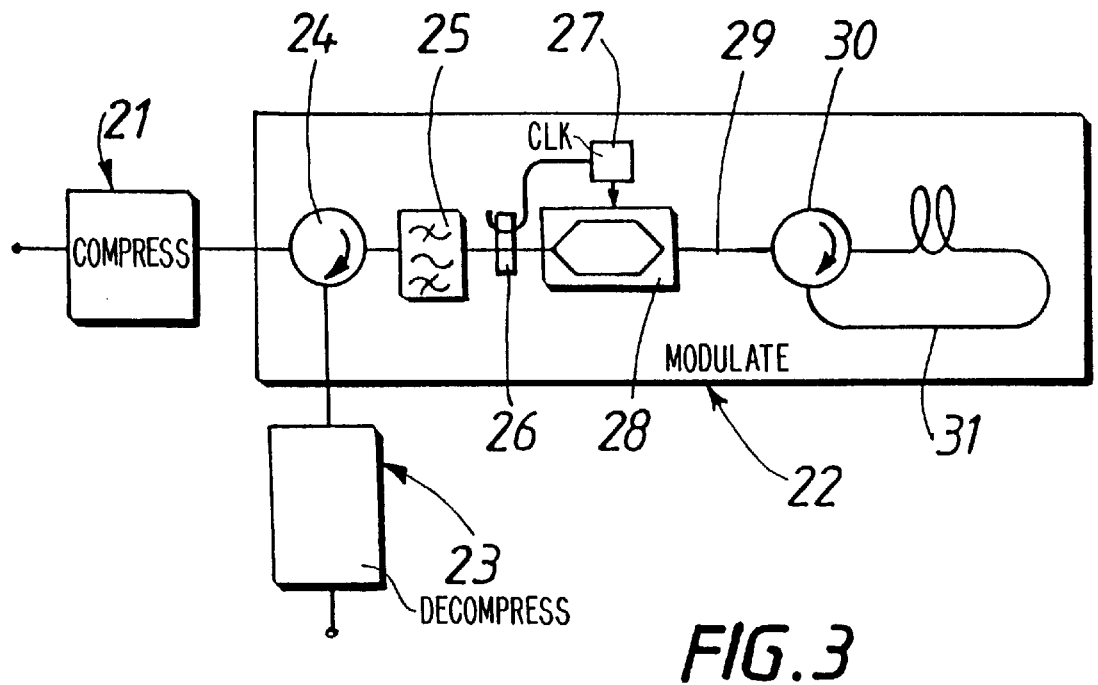
FIG. 3 is a diagram showing a second embodiment of a regenerator of the invention.

FIG. 3 is a diagram showing a second embodiment of a regenerator of the invention. In this embodiment, the synchronous modulation is applied twice to the soliton-type signals, so as to reduce the amplitude noise. The amplitude noise is removed in part by the first synchronous modulation, because of the duty ratio of the modulation clock. The noise is dispersed during the propagation, and it is again removed in part by the second synchronous modulation, as explained in the above-mentioned passage from the article by H. Kubota.

Like the FIG. 1 regenerator, the regenerator shown in FIG. 3 comprises compression means 21, modulation means 22, and decompression means 23. The compression means 21 and the decompression means 23 are not described in any more detail. At their inlet, the modulation means include a three-port circulator 24 which receives the soliton-type signals to be modulated via a first port, and transmits them so that they are output via a second port. The signals to be modulated are delivered to a narrow or guiding filter 25, then, at the outlet of the filter 25, they are delivered to a coupler 26 which diverts a portion thereof towards a clock recovery circuit 27; the remaining portion of the soliton-type signals is delivered to a synchronous modulator 28 which is controlled by the clock delivered by the circuit 27. The modulator 28 performs phase or intensity modulation on the soliton-type signals. The outlet 28 of the modulator is connected via a length of fiber 29 to a first port of a second circulator 30. The circulator 30 delivers the signals as modulated once to a propagation medium, e.g. a soliton fiber 31. After propagating along the fiber 31, the signals return to a third port of the circulator 30, and they are transmitted by the circulator to the synchronous modulator 28 via the fiber 29. The total length of the fibers 29 and 31 is chosen such that the signals delivered by the circulator 30 to the modulator 28 are in phase with the clock. They are thus modulated a second time, and they are then delivered via the filter 25 to the second port of the first circulator 24 which outputs them via its third port. The filter 25 stops the clock if necessary. Other filters or amplifiers can be added to the FIG. 3 circuit, as a function of needs.

To achieve the same amplitude noise reduction effects, it is also possible to connect together in series a plurality of regenerators of the type shown in FIG. 1, or else to connect together in series a plurality of modulators or the type shown in FIG. 3, until a suitable regeneration effect is obtained.

Figure 4:
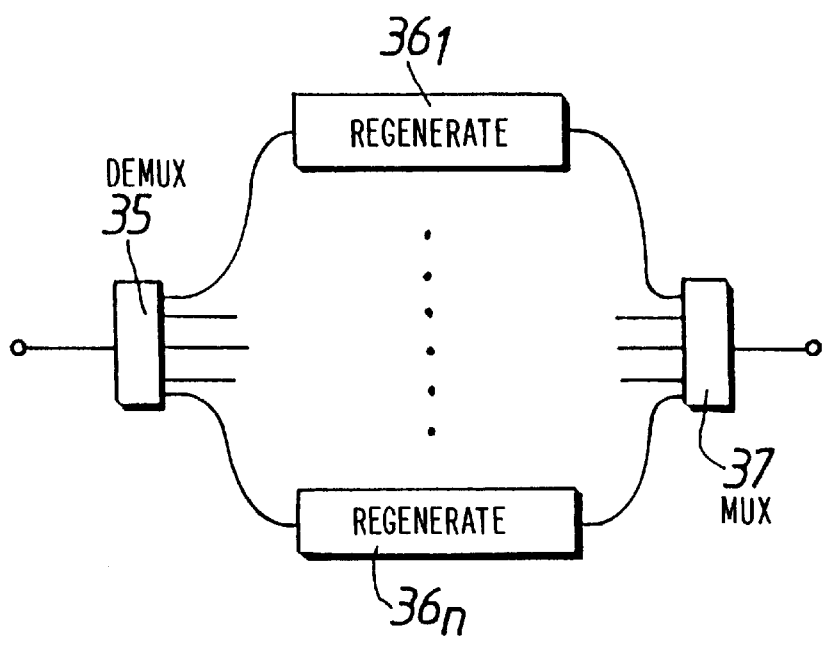
FIG. 4 is a diagram showing a third embodiment of a regenerator of the invention, as suitable for multiplexed RZ signals.

FIG. 4 is a diagram showing a third embodiment of a regenerator of the invention that is suitable for multiplexed RZ signals. The FIG. 4 regenerator is suitable for the case when multiplexing is applied in the transmission system to the non-soliton RZ optical signals. It may be time division multiplexing (OTDM) or wavelength division multiplexing (WDM).

At its inlet, the regenerator shown in FIG. 4 includes demultiplexing means 35 for demultiplexing the multiplexed RZ optical signals, which demultiplexing means deliver the signals of the various channels at a plurality of outlets. It then includes a plurality of regenerators $36_n$ to $36_n$, of the type described with reference to FIGS. 1 to 3, which regenerators apply synchronous modulation to the demultiplexed RZ signals. After the regenerators, the FIG. 4 circuit includes multiplexing means 37 for multiplexing the regenerated signals. It is clear to a person skilled in the art how the FIG. 4 regenerator operates. This regenerator makes it possible for the invention to be applicable also to multiplexed signals.

An alternative to the circuit shown in FIG. 4 is a circuit in which the channels are not demultiplexed, i.e. a single regeneration circuit is common to the multiplex, which assumes that all of the channels of the multiplex are suitably synchronized at the modulator 9 shown in FIG. 1. Such synchronization may be achieved by synchronization means, such as delay lines, dispersion compensators, or an appropriate choice of wavelengths for the signals of the multiplex, such means being known per se to a person skilled in the art. After the regeneration, the multiplex is re-shaped if necessary.

The invention is also applicable to transmission systems using NRZ signals. In which case, it is necessary merely to provide conventional NRZ-to-RZ conversion means upstream from a regenerator of the above-described type, and conventional RZ-to-NRZ conversion means downstream therefrom. Clearly, it is possible to invert the NRZ-to-RZ conversion means and the demultiplexing means, as a function of configuration.

Naturally, the present invention is not limited to the embodiments described and shown, but rather it lends itself to numerous variants that are accessible to a person skilled in the art.

What is claimed is:

1. A method of regenerating non-soliton RZ optical signals, the method comprising the following steps:
   a compression step whereby the RZ signals are compressed into soliton-type signals;
   a modulation step whereby synchronous optical modulation is performed on the soliton-type signals, by using a clock; and
   a decompression step whereby the modulated soliton signals are decompressed into non-soliton RZ signals.

2. A method according to claim 1, including a clock recovery step whereby the clock is recovered from the non-soliton RZ signals, from the soliton-type signals, or from the regenerated non-soliton RZ signals.

3. A method according to claim 1, wherein the compression step comprises at least one of the following steps:
   performing spectrum or time processing on encoded optical signals, in particular by spectrum filtering;
   amplification; and
   causing the signals to propagate along a highly dispersive non-linear optical medium.

4. A method according to claim 1, wherein the decompression step comprises at least one of the following steps:
   time spreading; and
   post-amplification.

5. A method according to claim 1, wherein the modulation step whereby synchronous optical modulation is performed on the soliton-type signals is repeated so that it is performed at least twice.

6. A method according to claim 1, including at least one filtering step whereby the soliton-type signals are filtered by a filter chosen from the group formed of guiding filters and sliding guiding filters.

7. A method of regenerating NRZ optical signals, the method comprising:
   an NRZ-to-RZ conversion step whereby the NRZ optical signals are converted into non-soliton RZ signals;
   a regeneration step whereby the non-soliton RZ signals are regenerated using the method of claim 1; and
   an RZ-to-NRZ conversion step whereby the regenerated RZ optical signals are converted into NRZ signals.

8. A method of regenerating multiplexed non-soliton RZ optical signals, the method comprising:
   a demultiplexing step whereby the signals are demultiplexed;
   a regeneration step whereby the demultiplexed signals are regenerated using the method of claim 1; and
   a multiplexing step whereby the regenerated signals are multiplexed.

9. A method of regenerating multiplexed non-soliton RZ optical signals, the method comprising:
   a synchronization step whereby the channels of the multiplex are synchronized; and
   a regeneration step whereby the signals of the synchronized channels are regenerated using the method of claim 1.

10. A method of regenerating NRZ optical signals, the method comprising:
   an NRZ-to-RZ conversion step whereby the NRZ optical signals are converted into non-soliton RZ optical signals;
   a regeneration step whereby the non-soliton RZ optical signals are regenerated using the method of claim 1; and
   an RZ-to-NRZ conversion step whereby the regenerated RZ optical signals are converted into NRZ optical signals.

11. A method of regenerating multiplexed NRZ optical signals, the method comprising:
   a demultiplexing and NRZ-to-RZ conversion step whereby the NRZ optical signals are demultiplexed and converted into non-soliton RZ optical signals;
   a regeneration step whereby the RZ optical signals are regenerated using the method of claim 1; and
   a multiplexing and RZ-to-NRZ conversion step whereby the regenerated RZ optical signals are multiplexed and converted into multiplexed NRZ optical signals.

12. A method of regenerating multiplexed NRZ optical signals, the method comprising:
   an NRZ-to-RZ conversion step whereby the NRZ optical signals are converted into non-soliton RZ optical signals;
   a synchronization step, whereby the channels of the multiplex are synchronized;
   a regeneration step whereby the non-soliton RZ optical signals of the synchronized channels are regenerated using the method of claim 1; and
   an RZ-to-NRZ conversion step whereby the regenerated RZ optical signals are converted into NRZ optical signals.

13. A regenerator for regenerating non-soliton RZ optical signals, the regenerator comprising
   compression means for compressing the RZ signals into soliton-type signals;
   modulation means for performing synchronous optical modulation on the soliton-type signals, by using a clock; and
   decompression means for decompressing the modulated soliton signals into non-soliton RZ signals.

14. A regenerator according to claim 13, wherein the modulation means include clock recovery means for recovering the clock from the non-soliton RZ signals, from the soliton-type signals, or from the regenerated non-soliton RZ signals.

15. A regenerator according to claim 13, wherein the compression means comprise at least one of the following means:
   means for performing spectrum or time processing on encoded optical signals, in particular spectrum filtering means;
   amplification means; and
   a highly dispersive non-linear optical medium, in particular of variable dispersion.

16. A regenerator according to claim 13, wherein the decompression means comprise at least one of the following means:
   time spreading means; and
   post-amplification means.

17. A regenerator according to claim 13, wherein at least one of the compression means and of the decompression means comprises a length of optical fiber.

18. A regenerator according to claim 13, including cascading means for cascading the modulation means, for at least a portion of the soliton-type signals.

19. A regenerator according to claim 18, wherein the cascading means comprise a first circulator upstream from the modulation means, a second circulator downstream therefrom, and a non-linear propagation medium;
   wherein the first circulator receives the signals to be modulated and delivers them to the modulation means, and it receives signals that have been modulated twice from the modulation means and delivers them to the decompression means; and
   wherein the second circulator receives signals that have been modulated once from the modulation means and delivers them to the propagation means, and it receives the signals that have propagated along the propagation medium and delivers them to the modulation means.

20. A regenerator according to claim 13, including filtering means for filtering the soliton-type signals, which means are chosen from the group formed of guiding filters and of sliding guiding filters.

21. A regenerator for regenerating multiplexed non-soliton RZ optical signals, the regenerator comprising:
   demultiplexing means for demultiplexing the signals;
   a plurality of regenerators according to claim 13; and
   multiplexing means for multiplexing the regenerated signals.

22. A regenerator for regenerating multiplexed non-soliton RZ optical signals, the regenerator comprising:
   synchronization means for synchronizing the channels of the multiplex; and
   a regenerator according to claim 13.

23. A regenerator for regenerating NRZ optical signals, the regenerator comprising:
   NRZ-to-RZ conversion means for converting the NRZ optical signals into non-soliton RZ optical signals, upstream from said compression means;
   a regenerator according to claim 13; and
   RZ-to-NRZ conversion means for converting the regenerated RZ optical signals into NRZ optical signals, downstream from said decompression means.

24. A regenerator for regenerating multiplexed NRZ optical signals, the regenerator comprising:
   demultiplexing and NRZ-to-RZ conversion means for demultiplexing the NRZ optical signals and converting them into non-soliton RZ optical signals;
   a plurality of regenerators according to claim 13; and
   multiplexing and RZ-to-NRZ conversion means for multiplexing the regenerated RZ optical signals and converting them into multiplexed NRZ optical signals.

25. A regenerator for regenerating multiplexed NRZ optical signals, the regenerator including:
   NRZ-to-RZ conversion means for converting the NRZ optical signals into non-soliton RZ optical signals;
   synchronization means for synchronizing the channels of the multiplex; and
   a regenerator according to claim 13.

26. An optical-fiber optical transmission system including at least one regenerator according to claim 13.

* * * * *